United States Patent
Adomeit et al.

[19]

[11] Patent Number: 5,988,677
[45] Date of Patent: Nov. 23, 1999

[54] AIRBAG MODULE

[75] Inventors: Heinz-Dieter Adomeit; Harald Jahnke; Eleonore Braun, all of Berlin; Thomas Marotzke, Bergfelde, all of Germany

[73] Assignee: Petri AG, Germany

[21] Appl. No.: 08/836,496

[22] PCT Filed: Sep. 15, 1995

[86] PCT No.: PCT/DE95/01310

§ 371 Date: May 7, 1997

§ 102(e) Date: May 7, 1997

[87] PCT Pub. No.: WO96/15923

PCT Pub. Date: May 30, 1996

[30] Foreign Application Priority Data

Nov. 17, 1994 [DE] Germany .............................. 44 42 202

[51] Int. Cl.⁶ .................................................. B60R 21/28
[52] U.S. Cl. .......................................... 280/740; 280/736
[58] Field of Search ..................... 280/740, 736, 280/728.1, 731, 732, 730.1, 730.2

[56] References Cited

U.S. PATENT DOCUMENTS

| | | | |
|---|---|---|---|
| 3,606,377 | 9/1971 | Martin ............................... | 280/150 AB |
| 3,618,981 | 11/1971 | Leising et al. .................... | 280/150 AB |
| 3,632,133 | 1/1972 | Hass .................................. | 280/150 AB |
| 3,887,214 | 6/1975 | Brawn ............................... | 280/732 |
| 4,068,862 | 1/1978 | Ishi et al. .......................... | 280/740 |
| 4,191,392 | 3/1980 | Barnett ............................. | 280/740 |
| 4,332,398 | 6/1982 | Smith ................................ | 280/732 |
| 5,259,643 | 11/1993 | Kraft et al. ........................ | 280/740 |
| 5,290,059 | 3/1994 | Smith et al. ...................... | 280/728.1 |
| 5,326,131 | 7/1994 | Yokota et al. .................... | 280/728 A |
| 5,340,151 | 8/1994 | Sato .................................. | 280/740 X |
| 5,498,030 | 3/1996 | Hill et al. .......................... | 280/743.1 |
| 5,531,476 | 7/1996 | Kerner ............................. | 280/743.1 |
| 5,626,358 | 5/1997 | Ricks et al. ...................... | 280/731 |
| 5,681,052 | 10/1997 | Ricks et al. ...................... | 280/743.1 |
| 5,755,457 | 5/1998 | Specht .............................. | 280/740 |

FOREIGN PATENT DOCUMENTS

| | | |
|---|---|---|
| 0602785 | 6/1994 | European Pat. Off. . |
| 0607671 | 7/1994 | European Pat. Off. . |
| 0620140 | 10/1994 | European Pat. Off. . |
| 1 955 145 | 5/1970 | Germany . |
| 2 008 093 | 9/1970 | Germany . |
| 2152906 | 4/1973 | Germany . |
| 86 19 670 | 9/1987 | Germany . |
| 4019677 | 1/1992 | Germany . |
| 42 00 833 A1 | 7/1992 | Germany . |
| 41 37 691 A1 | 11/1992 | Germany . |
| 43 21 226 A1 | 1/1994 | Germany . |
| 42 27 559 A1 | 2/1994 | Germany . |
| 96/25309 | 8/1996 | WIPO ................................... 280/740 |

*Primary Examiner*—Christopher P. Ellis
*Attorney, Agent, or Firm*—Christie, Parker & Hale, LLP

[57] ABSTRACT

An airbag module with a gas generator, a blow diffuser, and a gas bag has at least one blow diffuser extending into a fold of the folded gas bag. The blow diffuser extends as far as the region of the gas bag cover and the folded gas bag is fitted essentially beside the blow diffuser and is arranged around it. With this airbag module, the gas bag is drawn from the housing and not pushed in the usual manner.

25 Claims, 10 Drawing Sheets

AIRBAG MODULE

BACKGROUND OF THE INVENTION

The invention relates to an airbag module and more specifically to an airbag module which controls the rate and direction of expansion of an associated gas bag.

Passenger airbag modules are disposed in the dashboard in front of the passenger seat and have a housing in which a tubular generator is disposed. Above this tubular generator a gas bag extends in the direction of the passenger over the entire length of the tubular generator, as is known, for example, from U.S. Pat. No. 4,191,392 and from European Patent No. A-0 602 785. In a housing cover located between the tubular generator and the gas bag, openings are located on either side of the tubular generator over its entire length, through which openings the gases escaping from the generator enter the gas bag through its inflation port upon firing of the generator in the event of a crash. In a self-contained airbag arrangement, wherein the tubular generator is disposed inside the airbag with a supporting housing and is enclosed by it, the openings are on the sides of the tubular generator and extend over its entire length. As a result of the side position of the openings, the gas bag is thus inflated over its entire length first on its sides before it opens completely.

This prior art arrangement of the passenger airbag module has the disadvantage that the side sections of the gas bag, where it is attached, are particularly heavily stressed upon inflation. These stresses may result in the tearing off of the gas bag from its anchoring. Consequently, in prior art passenger airbag modules, the edge of the inflation opening is reinforced and stitched several times, resulting in additional production time and costs.

The danger also exists that the split cover which covers the gas bag relative to the passenger compartment does not tear, as desired, in the center, but on the side instead.

The aforementioned disadvantages also exist, although to a lesser extent, in a driver airbag module in which a prior art gas generator which has the shape of a shallow can is used.

It is further known from European Patent No. A-0 620 140 to place a diffuser between the gas generator and the gas bag. The diffuser has, on the entire length of the gas generator, numerous openings through which the gas may flow into the gas bag in the event of a crash. Further known, from EP 0 607 671, is a hybrid gas generator which has a centrally disposed diffuser with side flow openings.

Even these arrangements of the diffuser have the aforementioned disadvantages since the gas bag is bombarded with gas in all cases upon deployment virtually simultaneously over its entire surface above the diffuser and is explosively pushed out of the housing. Thus, the gas bag pack as a whole is greatly accelerated and pushed out of the module housing, whereby the surface stressing of the module cover is great and high bursting forces thus occur.

From U. S. Pat. No. 4,332,398, an inflatable restraint system is known which has a tubular gas generator, a cylindrical diffuser, and a flow control arrangement connected to these. This arrangement terminates in a nozzle which extends, in the inactivated state of the restraint system, into the partially deployed gas bag, whereby most of the gas bag is folded next to the gas generator. The cylindrical diffuser is positioned at the rear of the nozzle and has openings for the discharge of the gas. In additional to the control arrangement with the nozzle, retarders are present which press the gas bag against the walls of the control arrangement. These additional structural elements are claimed to prevent the conventional explosive inflation of the gas bag. As a result of the friction between the gas bag on the one hand and the control arrangement and the retarders on the other, the inflation is decelerated, particularly at the beginning of the inflation process.

This restraint system has the disadvantage that additional components are necessary to achieve a delayed opening of the gas bag.

SUMMARY OF THE INVENTION

Briefly an embodiment of the invention is an airbag module, a gas bag generator, a gas bag gathered into a number of folds, and an inflation diffuser including a number of openings positioned in one of the gas bag folds.

An embodiment of the invention further improves the deployment process and the cover tearing process and reduces the stressing of the edges of the gas bag in an airbag module.

According to one embodiment, in an airbag module with a gas generator, an inflation diffuser, and a gas bag, at least one diffuser which extends into one fold of the folded gas bag is provided. It is advantageous that the diffuser extends in the region of the cover, preferably as far as directly under the cover, and that the folded gas bag is positioned substantially next to the diffuser and is preferably disposed around the diffuser.

Due to the fact that the diffuser extends into one fold of the folded gas bag, the gas bag is, in the event of a crash, first bombarded with pressurized gas only in the region of this fold and the space under this fold is enlarged to form a chamber. Only after that are the remaining regions of the gas bag inflated. Thus, the process of deployment and tearing the cover is optimized.

This process is essentially supported by gathering the fabric of the gas bag into folds. Consequently, in an advantageous embodiment, the gas bag is installed in gathers around the inflation diffuser. In this type of folding, the folds run roughly parallel to the diffuser. Thus, it is guaranteed that the folds do not undercut each other and interfere with each other during deployment.

The stressing of the edge of the gas bag opening or the inflation port of the gas bag is also reduced by the arrangement according to the invention.

With the arrangement of the diffuser according to the invention, it is easily possible to influence the deployment characteristics of the gas bag. In one embodiment, in which the diffuser is disposed in the center relative to the gas bag, the gas bag is inflated uniformly toward all sides.

However, if it is desired that the gas bag first be inflated in a preferred direction, this can be achieved by disposing the diffuser eccentrically relative to the gas bag. If the diffuser is provided in a fold on the edge of the gas bag, the gas bag will unfold first in this region. In this case, the inflation diffuser may even lie in one of the outermost folds such that there is only one layer of fabric on one side of the inflation diffuser.

In one embodiment, in a passenger airbag module in a housing, a wall with an inflation diffuser protruding centrally into the folded gas bag is provided between a tubular gas generator and the gas bag to accommodate both a gas generator and the gas bag. The inflation diffuser has inflation openings on its sides and/or directed toward the cover of the gas bag. It further has a shape adapted to the fold into which it protrudes. In adaptation to different foldings of the gas bag, the cross-section of inflation diffuser may be designed finger-shaped or as a cap. This embodiment yields the additional advantage that the inflation diffuser may be used as a support during the gathering of the gas bag, whereby an improvement in the assembly process is obtained.

In another embodiment, the inflation diffuser is at least partially constructed from a wire mesh. Thus, additional turbulence of the gas leaving the gas generator is obtained.

The inflation diffuser contributes, due to its material-specific thermal capacity, to the cooling of the gas leaving the gas generator. This cooling effect may be further reinforced by providing a metal filter fabric inside the inflation diffuser or by making the diffuser out of metal filter fabric.

In an advantageous embodiment, at the edge of the inflation port or at the edge of the opening of the gas bag between the inflation diffuser and a part of the housing, an insertable component is attached. The edge of the opening of the gas bag can extend between clamping surfaces of an external housing and an internal housing. In this embodiment, it is no longer necessary to expensively stitch around the inflation port since the danger of the edge ripping out no longer exists, due to the reduced forces on the edge.

In another embodiment, provision is made that the edge of the inflation port of the gas bag extends between one edge of the inflation diffuser and a groove in the partition of an external housing. The housing is hinged to swing open around an axis for initial installation of the tubular generator and gas bag assembly. It is also possible that the edge of the inflation port of the gas bag extends between the edge of the inflation diffuser and annular segments, whereby the annular segments, the edge of the inflation diffuser, and the edge of the inflation port of the gas bag are connected to each other.

In one embodiment the gas bag is installed around the inflation diffuser. In an alternate embodiment, the gas bag is installed around the gas generator as well as the infusion diffuser. Here, it is particularly advantageous if the gas bag is installed in gathers. With gathering, the diffuser may serve as a support during the gathering process, whereby the assembly process of the gas bag is simplified.

To hold the gas bag together in its folded state, it is possible for it to be circumferentially surrounded by a tension band or a film.

DESCRIPTION OF THE DRAWINGS

The invention is explained through exemplary embodiments with reference to the drawings. They depict:

FIG. 11b is a top plan view of the inflation diffuser of FIG. 11a;

DETAILED DESCRIPTION OF THE INVENTION

Figure 1:
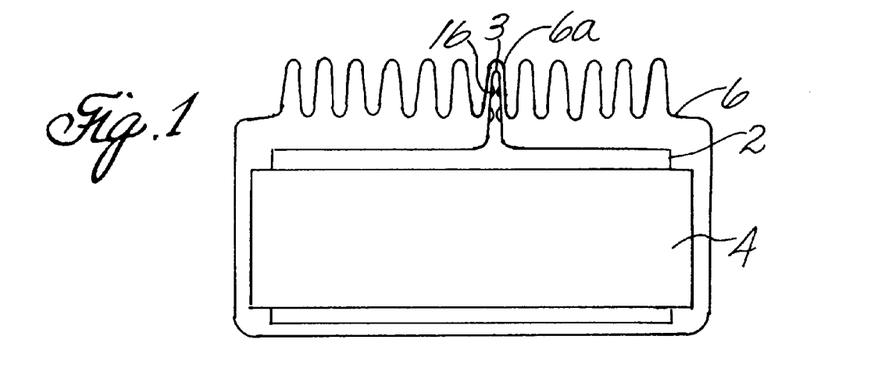
FIG. 1 is a longitudinal view of the tubular generator with a diffuser according to the invention in one fold of a folded gas bag, partially cutaway.
Figure 2:
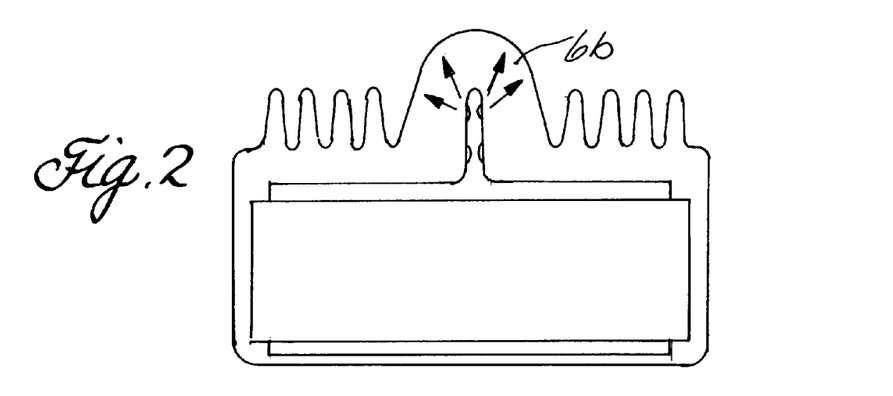
FIG. 2 is a longitudinal view of the arrangement according to the FIG. 1 at the beginning of deployment.

In the schematic depiction of FIG. 1, a tubular gas generator 4 according to one embodiment of the invention is disposed in a housing 2 which hermetically encloses the tubular gas generator. The housing 2 is provided with a finger-shaped, or cylindrical inflation diffuser 3, which extends tangentially from the tubular gas generator 4 and engages in one fold 6a of a folded gas bag 6. Because of the hermetic seal of the housing 2, the gas leaving the gas generator in the event of a crash can enter the gas bag only from inflation openings 16 of inflation diffuser 3. Thus, the gas bag is, as depicted in FIG. 2, first unfolded immediately next to the inflation diffuser 3 such that an enlarged chamber or an enlarged space 6b is created around the inflation diffuser 3. Starting from there, the further unfolding of the gas bag toward the sides occurs.

Figure 3:
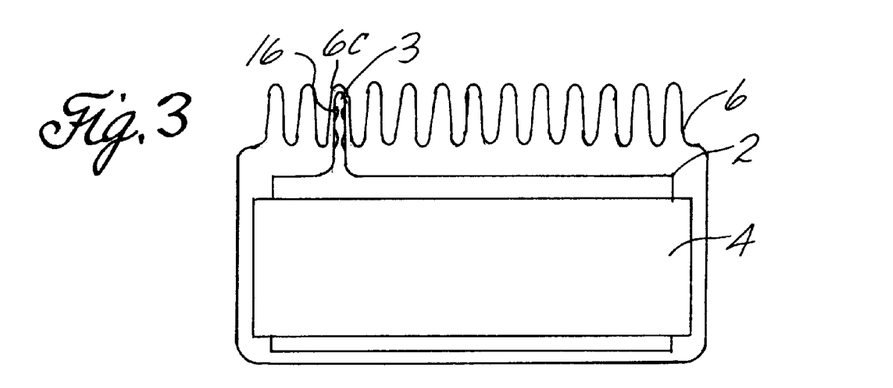
FIG. 3 is a longitudinal view of a tubular generator with a diffuser according to the invention in one fold of a folded gas bag, partially cutaway.

Whereas in FIGS. 1 and 2 the inflation diffuser 3 is disposed in the center of the gas bag, FIG. 3 depicts an embodiment wherein the inflation diffuser is provided in an eccentrically located fold 6c. As a result, the gas bag 6 unfolds on the right side in the drawing with a delay compared to the left side.

Figure 4:
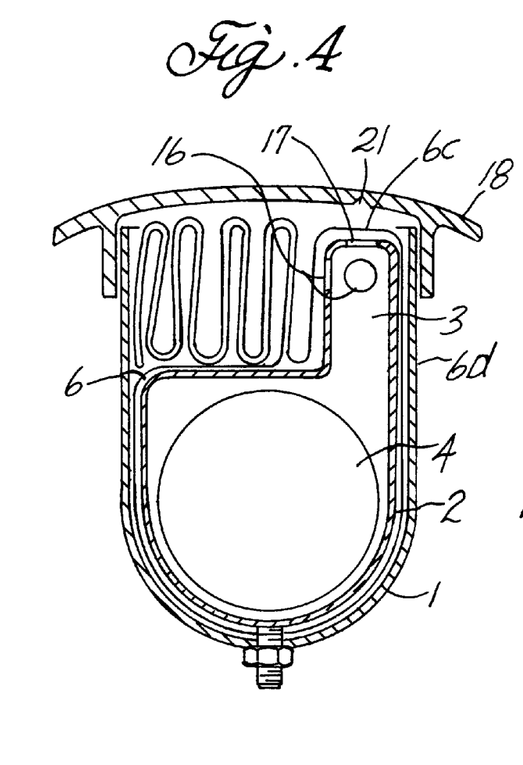
FIG. 4 is a cross-sectional front view through a passenger airbag module with a gas bag gathered in folds in the longitudinal direction of a tubular generator.
Figure 5:
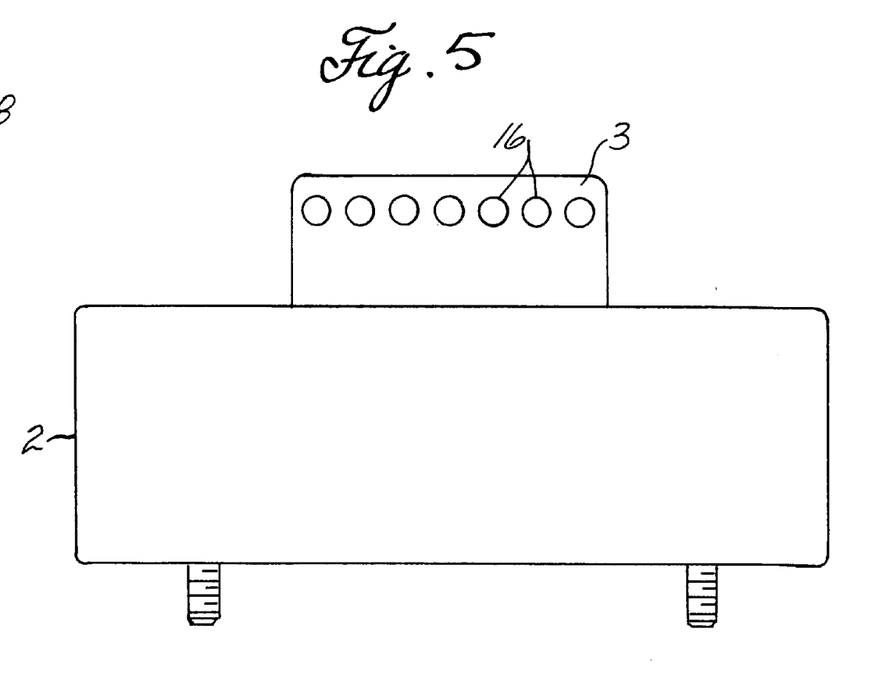
FIG. 5 is a longitudinal view of the gas impermeable housing with the diffuser according to FIG. 4.

FIGS. 4 and 5 depict an airbag module whereby the tubular gas generator 4 is disposed in the internal gas impermeable housing 2, which serves as a gas collecting tube. On the housing 2 and off center relative to the longitudinal axis of the tubular gas generator 4, is disposed a fin-shaped inflation diffuser 3 extending longitudinally along the crosswise axis of the housing(FIG. 5). The housing 2 with the inflation diffuser 3 is disposed in the gas bag 6, the folds of which lie next to the inflation diffuser in the form of gathers. It can be seen that the inflation diffuser lies in a rightmost fold 6a of the folded gas bag 6 so that to the right of the inflation diffuser extends only one fabric layer 6d. The inflation diffuser has on its sides inflation openings 16 and at least one inflation opening 17 aimed upward.

Another advantage of this arrangement is that the inflation diffuser may serve as a support for the gas bag during the folding process, thereby simplifying the assembly process.

The internal housing 2 is installed inside an external housing 1 which is provided with a cover 18. This cover has a breaking point 21 which runs above the inflation diffuser 3. Analogously to the exemplary embodiment of FIGS. 1 and 2, upon inflation of the gas bag, a chamber first forms above the inflation diffuser 3 and consequently below the breaking point 21. Through this pressure on the cover 18 restricted locally to the region of the breaking point, the cover is torn in this region. Upon the tearing of the cover, less surface stress occurs than with prior art arrangements without the diffuser disposed according to the invention.

Due to the fact that the diffuser extends into one fold of the folded gas bag, the gas bag is, in the event of a crash, first bombarded with pressurized gas only in the region of this fold and the space under this fold is enlarged to form a chamber. Only after that are the remaining regions of the gas bag inflated. Thus, the process of deployment and tearing the cover is optimized. The aforementioned chamber is the part of the gas bag first inflated and is driven by the gas flow primarily in the direction of the gas flow. The direction of the gas flow is predetermined by the type of diffuser; its position as well as the size and arrangement of the discharge openings. In this process, the remaining folded part of the gas bag is pulled out bit by bit, whereby the gas bag is continuously enlarged in the form of a bubble with a relatively smooth surface, contrary to the case with prior art airbags. In airbag modules without the arrangement of the diffuser according to the invention, the gas bag is, in contrast, pushed out, not pulled. By the pulling out of the gas bag fabric, the gas bag is decelerated in the firing direction. The gas bag is gradually accelerated in the gas flow direction and the expansion direction.

Without the arrangement according to the invention, the gas bag pack as a whole is accelerated and pushed out of the module housing. This yields the disadvantage that the surface stress on the module cover is great and high bursting forces thus occur. To the contrary, with the arrangement according to the invention, at the time of deployment of the gas bag, the module cover is stressed at one concentrated point by one layer of fabric so that the surface stress is significantly lower. In addition, without the diffuser arrangement according to the invention, the deployment is hardly controllable since, after breaking out, the gas bag can deploy freely in all directions, uncontrolled. This disadvantage is also eliminated with the arrangement according to the invention.

The acceleration of the entire gas bag pack further results in high internal pressures in front of the opening of the cover and in great reaction forces. This can cause deformation of the housing in which the gas bag is packed. This disadvantage as well does not occur with the arrangement according to the invention.

Figure 6:
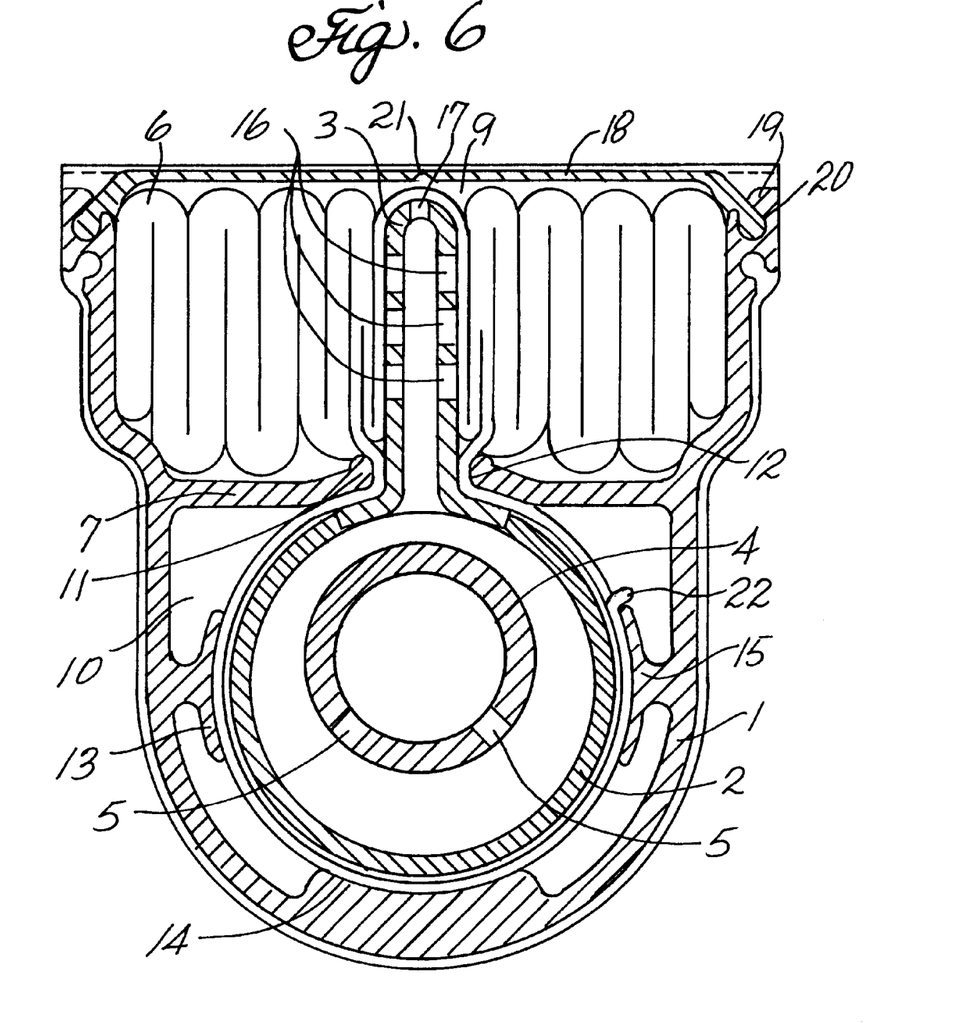
FIG. 6 is a cross-sectional side view through a passenger airbag module with a tubular gas generator disposed in the gas bag.
Figure 9:
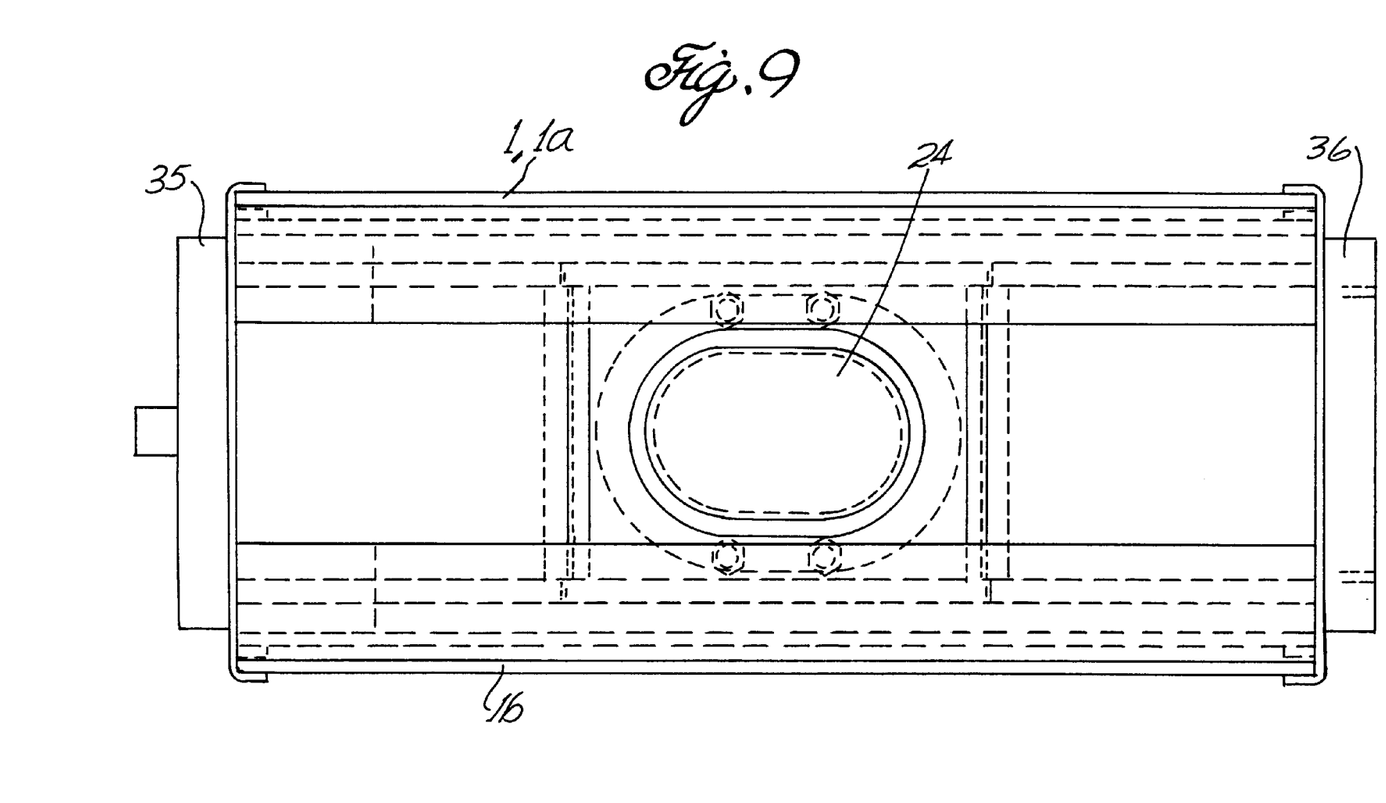
FIG. 9 is a top plan view of a passenger airbag module.

The passenger airbag module according to FIG. 6 has an external housing 1, which, in the present case, consists of an extruded profile sealed on the ends by end pieces 35, 36 (FIG. 9). In this housing 1 are provided the internal housing 2, which is gas impermeable and which is connected to the finger-shaped inflation diffuser 3. The tubular gas generator 4 with inflation openings 5 is disposed in the internal housing 2.

The internal housing 2 with the tubular gas generator 4 and the inflation diffuser 3 are disposed in the gas bag 6. The inflatable section of the gas bag lies on one side of a partition 7 in a gas bag space 9, whereas the internal housing 2 with the tubular gas generator 4 lie on the other side of the partition 7 in a generator space 10. The internal housing 2 and the tubular generator are enclosed in a non-inflatable portion of the gas bag 6c. The partition 7 extends inward from the outside walls of the external housing 1 crosswise and has in its center a toroidal section 11 which encloses an opening 12. Through this opening, the inflation diffuser 3 extends from the internal housing out into the folded gas bag lying in the gas bag space.

In the region of the partition 7, the gas bag 6 runs between the inflation diffuser 3 and the toroidal section 11 from the gas bag space 9 into the generator space 10. The gas bag is anchored both there and between the internal housing 2 and clamping surfaces 13, 14, 15 provided on the external housing. This anchoring is self-locking in the event of firing of the gas generator in the event of a crash since the internal housing 2 is pressed against the clamping surfaces 13, 14, 15 by the reaction forces of the gas generated, whereby the gas bag is firmly clamped.

The inflation diffuser 3 has side inflation openings 16 and at least one inflation opening 17 aimed in the direction of the cover 18. The cover 18 is attached on the side to the external housing 1 by means of a spring 19 and a corresponding groove 20 and has in its center a breaking point 21, which runs transversely above the cover.

The central inflation openings 16, 17 guarantee that the gas bag is inflated first in the center and that the cover 18 also tears first in the center at the breaking point 21. In addition, the edge 22 of the opening in the gas bag for the insertion of the internal housing 2 with the tubular gas generator 4 into the gas bag is stressed less than with the prior art arrangement of the inflation openings.

Figure 7:
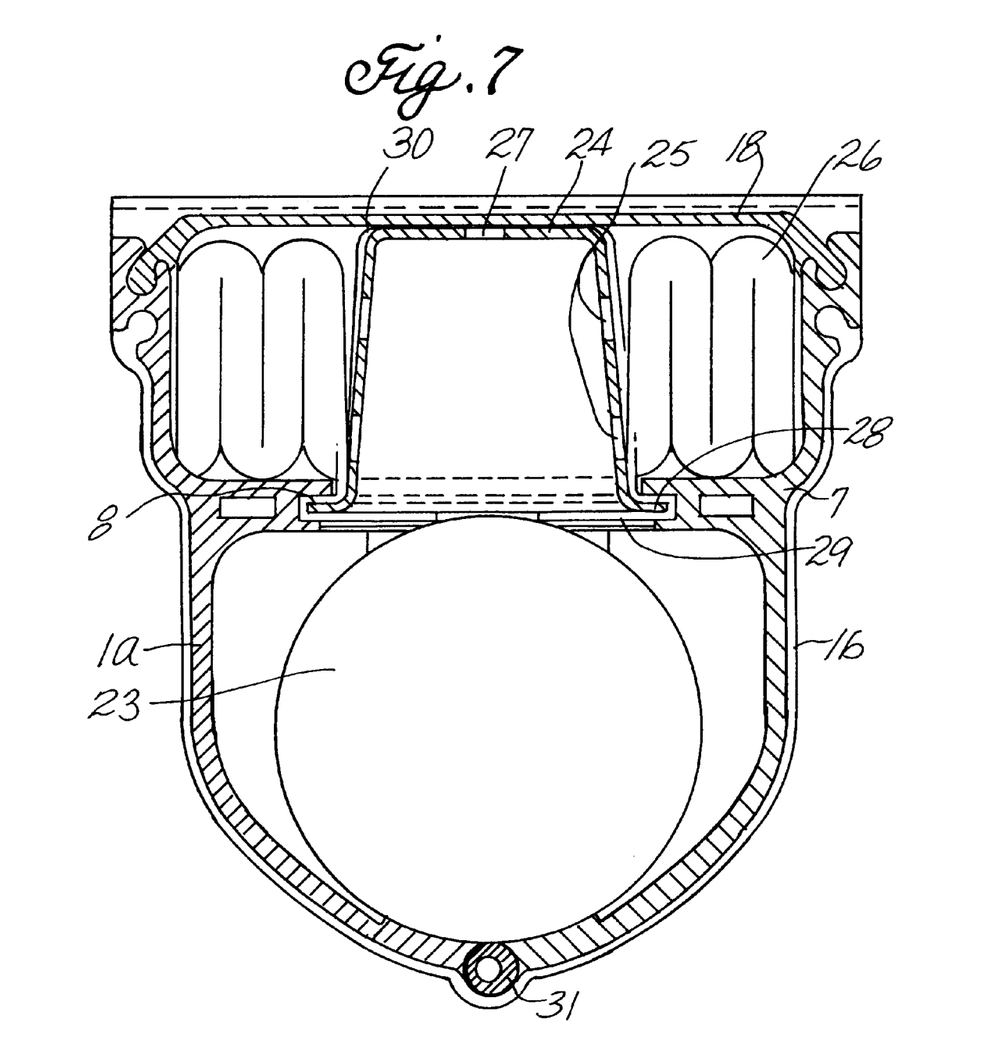
FIG. 7 is a cross-sectional side view of a passenger airbag module with a tubular gas generator disposed outside the gas bag.

In the embodiment of FIG. 7, a central inflation diffuser 24 is provided in the form of a truncated conical cap, or cup, on a tubular gas generator 23. This inflation diffuser has side inflation openings 25, around which the gas bag 26 is disposed in gathers. Additionally, the inflation diffuser 24 has at least one inflation opening 27 in the direction of the cover 18. The inflation diffuser 24 has an edge 28, which is anchored in a groove 8 of the partition 7. The edge 29 of the inflation port of the gas bag 26 runs between this edge 28 and the wall of the groove 8.

In this embodiment, a two-part housing 1a is provided. The housing is hinged around an axis 31 to swing open for installation of the inflation diffuser with the folded gas bag 26 into the housing.

With the gathering depicted, the advantage of the central inflation diffuser is particularly clear. With this type of folding, the folds lie next to each other. Thus, after firing of the tubular gas generator 23, the gas bag 26 is inflated from its center section 30 outward, whereby the gas bag is last inflated at its clamping point. Thus, the edge 29 of the inflation port of the gas bag is stressed less than in the prior art conventional arrangement of the inflation openings. Consequently, the edge 29 of the inflation port does not have to be stitched around expensively with a plurality of seams, but rather the seam at the inflation port can be produced, for example, by a laser cut. The melting of the fibers on the edge 29 which occurs during that process is adequate for the attachment of the edge.

Figure 8:
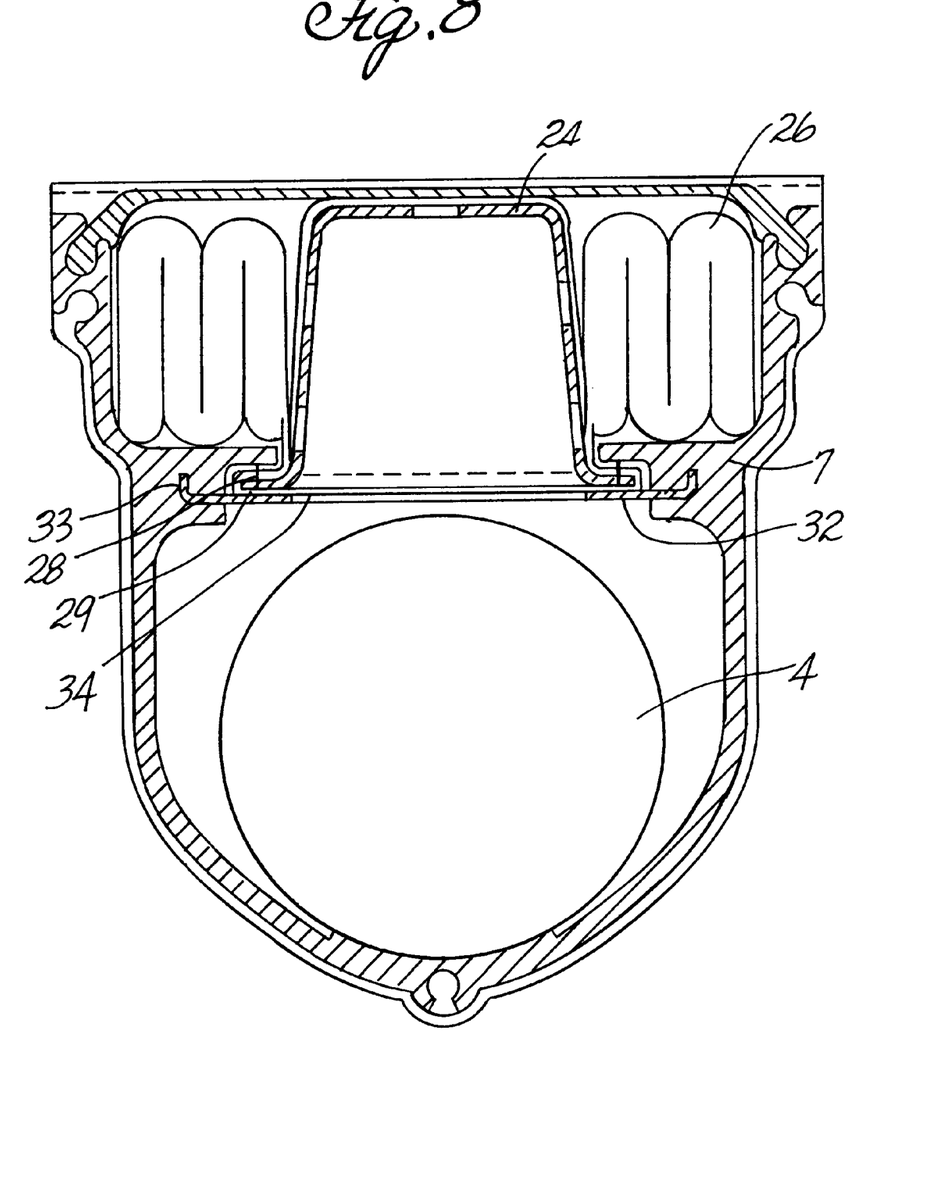
FIG. 8 is a view similar to FIG. 7 but showing a further embodiment of the invention.

In the exemplary embodiment of FIG. 8, a tubular gas generator 4 is again disposed in a one-part housing 1. In this exemplary embodiment, as in the exemplary embodiment of FIG. 7, an inflation diffuser 24 is provided with an edge 28. The difference is in the type of anchoring of the edge 28 in the housing 1. In this exemplary embodiment, additional annular segments 32 are provided, which are designed either as flat disk segments or, as depicted in FIG. 8, with an angled edge 33. These annular segments 32, the edge 28 of the inflation diffuser, and the edge 29 of the inflation port 34 of the gas bag 26 are connected to each other, for example, by rivets. This connection also guarantees a secure anchoring of the edge 29 of the inflation port, without having to specially stitch around the edge.

FIG. 9 depicts a top plan view of a passenger airbag module without the gas bag and without a cover. The inflation diffuser 24 and with it the inflation openings (not shown) are disposed centrally in the housing 1 or 1a, 1b.

Figure 10:
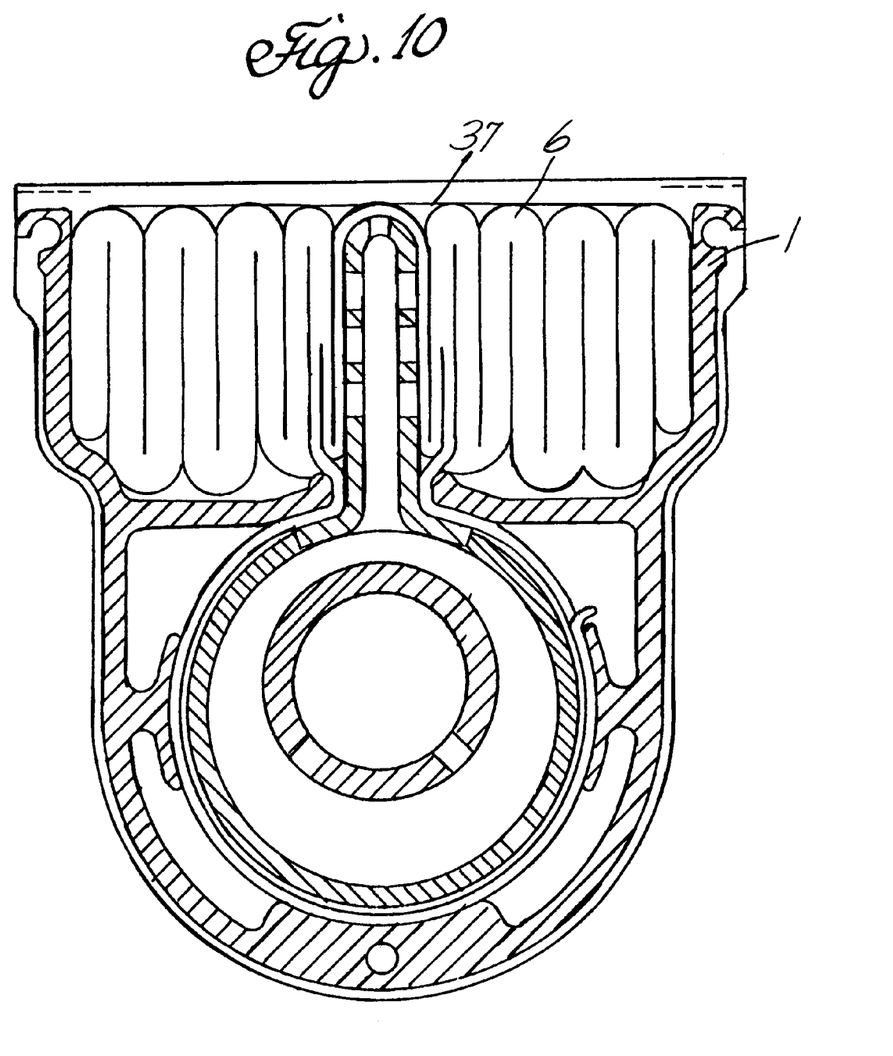
FIG. 10 is a cross-sectional view of passenger airbag module according to FIG. 6 without a cover.

In the previous exemplary embodiments, the gas bag was covered by a cover 18. In the exemplary embodiment of FIG. 10, which depicts a modification of the exemplary embodiment of FIG. 6, the cover is replaced by a film 37, which both covers the folded gas bag 6 on its top and holds it together on its sides, such that it does not fall apart even outside the housing 1. It is possible, in the same manner, to replace the cover in the exemplary embodiments of FIGS. 7 and 8.

Figure 11A:
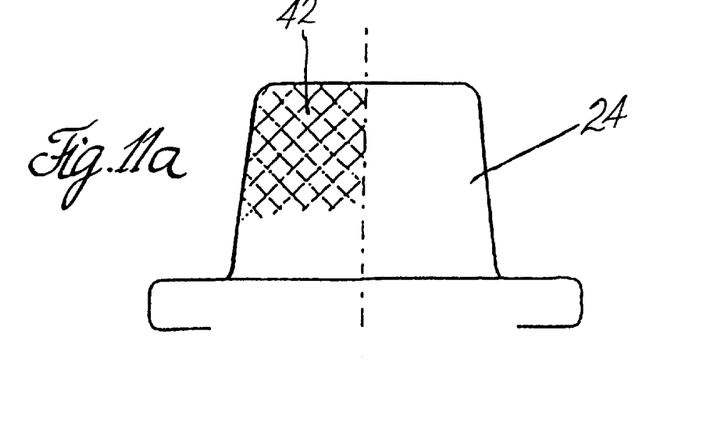
FIG. 11a is a side view of an inflation diffuser with wire mesh.
Figure 11B:
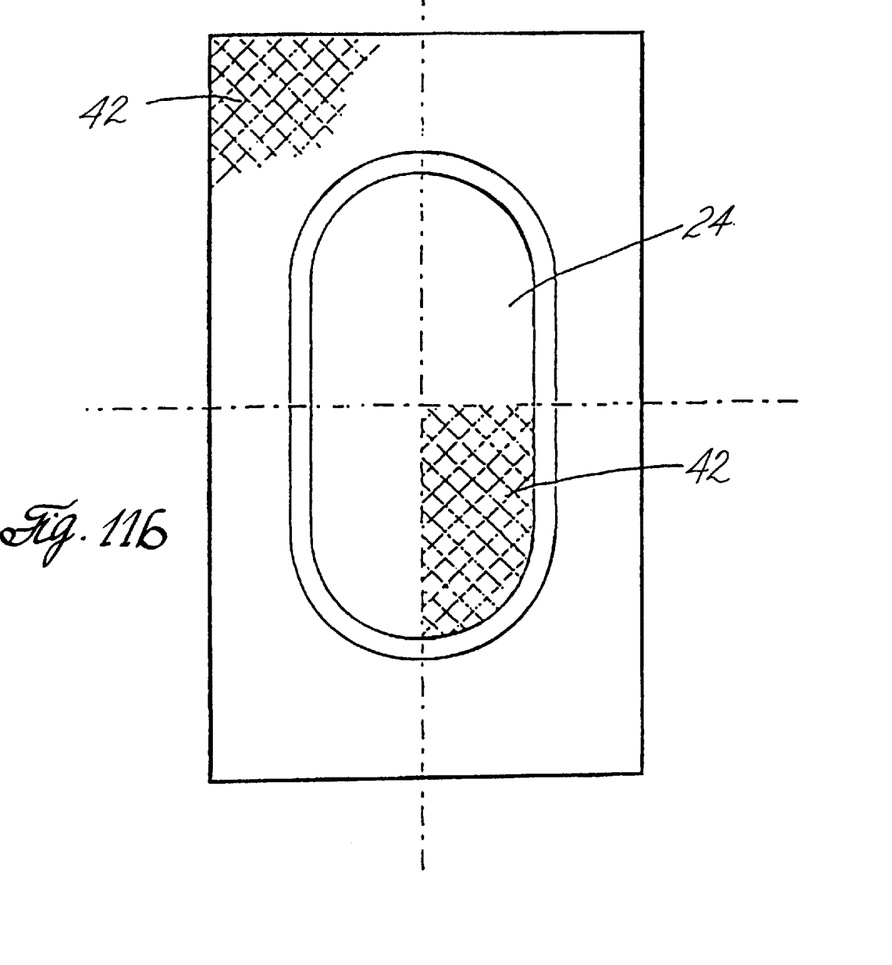

In FIG. 11a, a wire mesh, by means of which additional turbulence of the gas leaving the gas generator is obtained, is provided inside the inflation diffuser 24. FIG. 11b depicts a top plan view of the inflation diffuser according to FIG. 11a.

Figure 12:
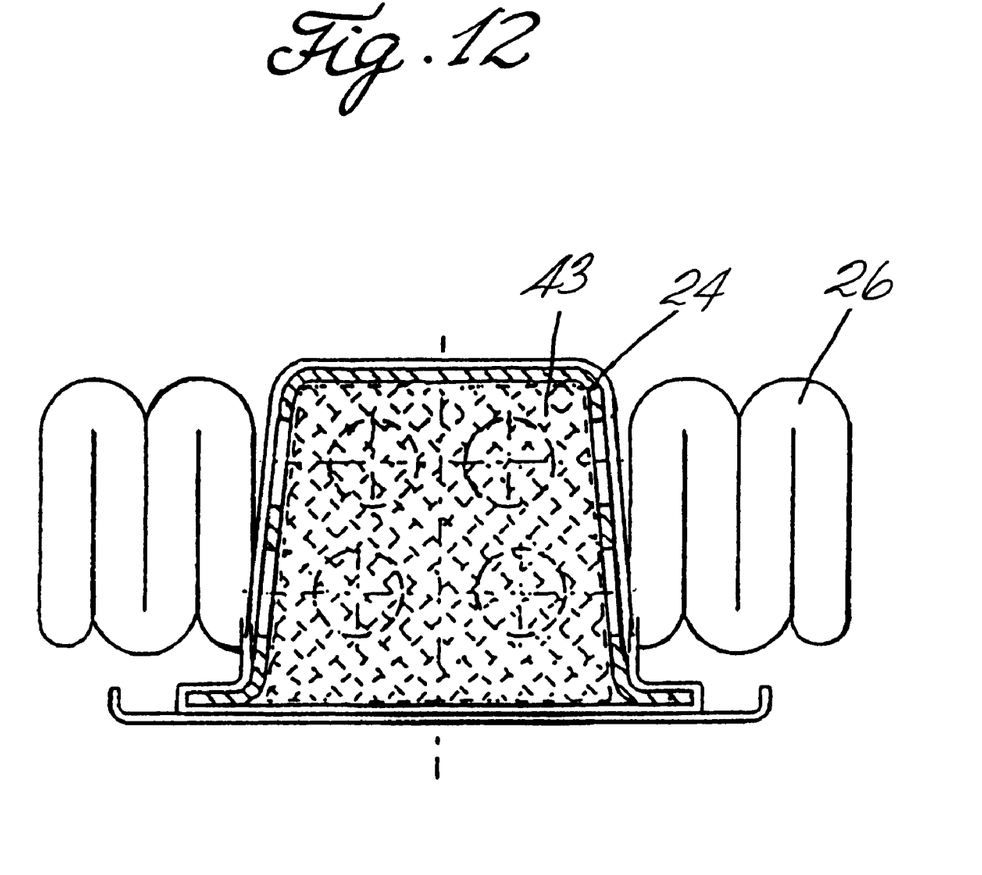
FIG. 12 is a side view of an inflation diffuser with metal filter fabric.

In the exemplary embodiment of FIG. 12, the inflation diffuser 24 is lined with a metal filter fabric 43. This metal filter fabric 43 serves simultaneously to cool and filter the gas and to attenuate the jet of gas by its turbulence. The thermal stressing of the gas bag is reduced by the cooling of the gas. Also, as a result of the filtration of the gas, burned particles which could cause damage to the gas bag are retained.

Figure 13:
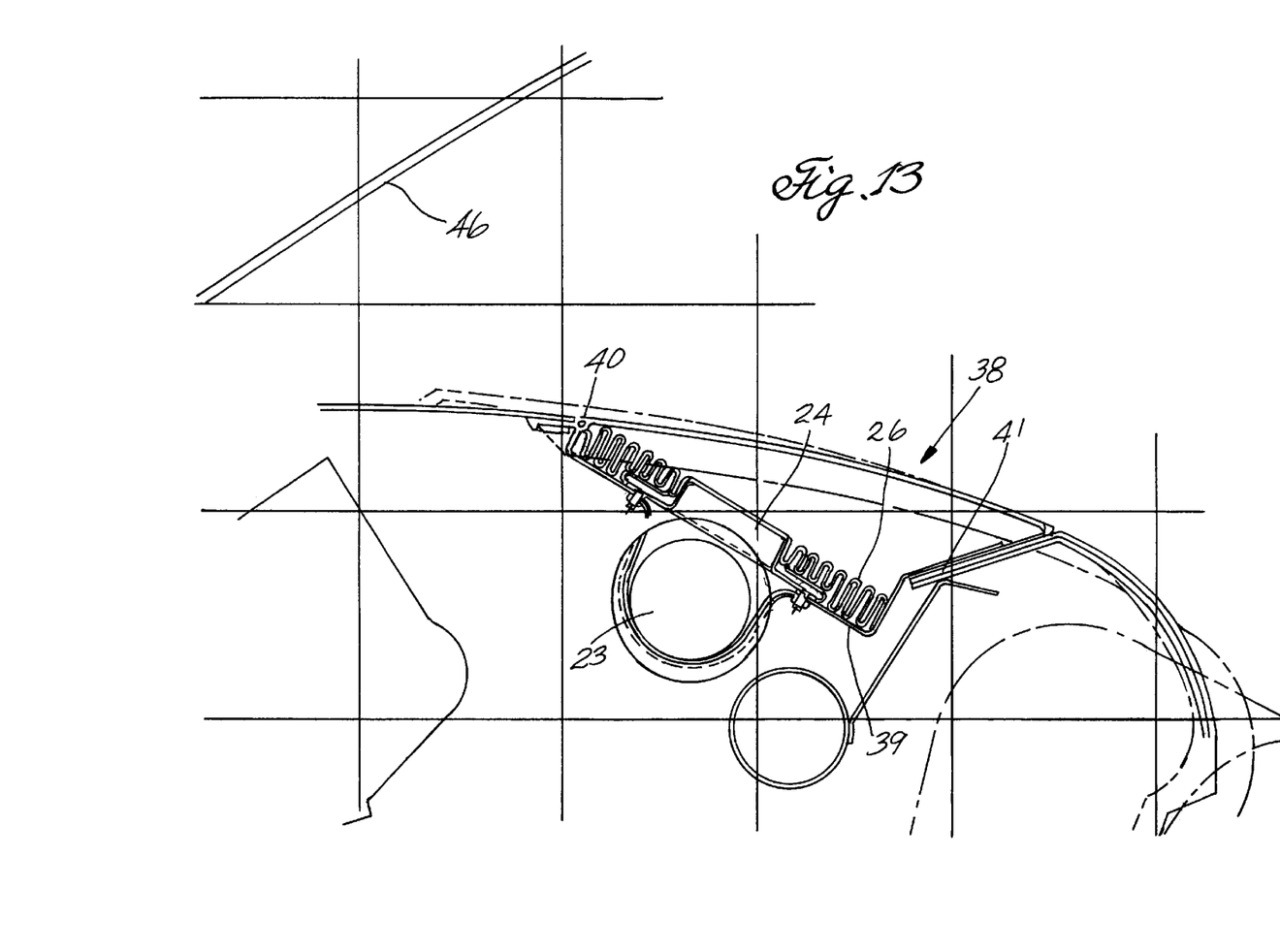
FIG. 13 is a cross-sectional view of a passenger airbag module built into the dashboard of a motor vehicle.

FIG. 13 schematically depicts the disposition of the passenger airbag module in the dashboard of a motor vehicle. In addition, the position relative to the windshield 46 can be seen. The attachment of a module with a tubular gas generator 23, an inflation diffuser 24, and a gas bag 26 in a dashboard 38 is depicted. In this exemplary embodiment, the module is attached to a support plate 39 which is connected to the dashboard 38 at attachment points 40, 41.

The disclosure of International application PCT/DE 95/01310 as published under WO 96/15923 on May 30, 1996 is incorporated fully herein by reference. Priority of this patent application is claimed.

Other modifications and variations of airbag module will be apparent to one skilled in the art. It is therefore to be understood that the scope of the invention should be limited only by the appended claims.

We claim:
1. An airbag module comprising:
a gas generator a gas bag comprising a plurality of folds, each of the folds having a first layer, and a second layer substantially parallel to the first layer and adjoining the first layer at a single bend; and
an inflation diffuser having a plurality of inflation openings and positioned between the first layer and the second layer of one fold of the plurality of folds.
2. The airbag module according to claim 1 wherein the gas bag contains the gas generator.
3. The airbag module according to claim 1 further comprising a cover and wherein the inflation diffuser is adjacent to the cover and to the folds of the gas bag.
4. The airbag module according to claim 3 wherein the inflation diffuser comprises at least one of the plurality of the inflation openings proximate the cover.
5. The airbag module according to claim 1 wherein the fold in which the inflation diffuser is positioned is located at substantially a center of the plurality of folds.
6. The airbag module according claim 1 wherein the fold in which the inflation diffuser is positioned is spaced away from a center of the plurality of folds.
7. The airbag module according to claim 6 wherein the inflation diffuser is positioned in a fold at an end of the plurality of folds.
8. The airbag module according to claim 1 wherein a side of the inflation diffuser comprises a plurality of the plurality of inflation openings.

9. The airbag module according to claim 1 wherein the fold in which the diffuser is positioned has a predetermined shape and wherein the diffuser has a shape substantially adapted to the shape of the fold.
10. The airbag module according to claim 1 wherein a cross section of the inflation diffuser is finger-shaped.
11. The airbag module according to claim 1 wherein a cross section of the inflation diffuser is cup-shaped.
12. The airbag module according to claim 1 wherein the inflation diffuser comprises a wire mesh.
13. The airbag module according to claim 1 wherein the inflation diffuser comprises an internal sheet of a metal filter fabric.
14. The airbag module according to claim 1 further comprising a housing having a partition, wherein the housing contains the gas generator, the gas bag and the inflation diffuser, and wherein the partition separates the gas generator and the folds of the gas bag.
15. The airbag module according to claim 14 wherein the partition comprises grooves, wherein the inflation diffuser comprises edges positioned in said grooves, and wherein the gas bag comprises an inflation port having edges interposed between the inflation diffuser edges and the partition grooves whereby a thrust of gas from the gas generator pushes the edges of the inflation diffuser against the partition grooves, thereby clamping the edges of the gas bag inflation port between the inflation diffuser edges and the partition grooves.
16. The airbag module according to claim 15 wherein the edges of the inflation port of the gas bag extends between clamping surfaces of an external housing and an internal housing.
17. The airbag module according to claim 15 further comprising a plurality of annular segments attached to the partition, wherein the edge of the inflation diffuser is positioned between the partition and the annular segments, wherein the edge of the inflation port is disposed between the edge of the inflation diffuser and the annular segments, and wherein the annular segments, the edge of the inflation diffuser, and the edge of the inflation port of the gas bag are connected to each other.
18. The airbag module according to claim 14 wherein the housing comprises two portions connected by hinges, whereby the housing may be swung open on the hinges to install the gas generator, the gas bag and the inflation diffuser.
19. The airbag module according to claim 1 wherein the folds of the gas bag are contained by a tension band.
20. The airbag module according to claim 1 wherein the folds of the gas bag are contained by a film.
21. The airbag module according to claim 1 wherein the inflation diffuser has a substantially cylindrical shape.
22. An airbag module comprising:
a gas generator;
a gas bag comprising a plurality of folds; and
an inflation diffuser having a plurality of inflation openings and positioned in one fold of the plurality of folds;
a housing having a partition, wherein the housing contains the gas generator, the gas bag and the inflation diffuser, and wherein the partition separates the gas generator and folds of the gas bag
wherein the partition comprises grooves and the inflation diffuser comprises edges positioned in said grooves, and wherein the gas bag comprises an inflation port having edges interposed between the inflation diffuser edges and the partition grooves whereby a thrust of gas from the gas generator pushes the edges of the inflation diffuser against the partition grooves, thereby clamping the edges of the gas bag inflation port between the inflation diffuser edges and the partition grooves.

23. The airbag module according to claim 22 wherein the edges of the inflation port of the gas bag extends between clamping surfaces of an external housing and an internal housing.

24. The airbag module according to claim 22 further comprising a plurality of annular segments attached to the partition, wherein the edge of the inflation diffuser is positioned between the partition and the annular segments, wherein the edge of the inflation port is disposed between the edge of the inflation diffuser and the annular segments, and wherein the annular segments, the edge of the inflation diffuser, and the edge of the inflation port of the gas bag are connected to each other.

25. An airbag module comprising:

a gas generator;

a gas bag comprising a plurality of folds; and an inflation diffuser having a plurality of inflation openings and positioned in one fold of the plurality of folds;

a housing having a partition, wherein the housing contains the gas generator, the gas bag and the inflation diffuser, and wherein the partition separates the gas generator and folds of the gas bag wherein the housing comprises two portions connected by hinges, whereby the housing may be swung open on the hinges to install the gas generator, the gas bag and the inflation diffuser.

* * * * *